(12) United States Patent
Kapinos et al.

(10) Patent No.: US 11,281,421 B1
(45) Date of Patent: Mar. 22, 2022

(54) ENHANCING MULTIPLE MONITOR ARRANGEMENTS

(71) Applicant: LENOVO (Singapore) PTE. LTD., New Tech Park (SG)

(72) Inventors: Robert J. Kapinos, Durham, NC (US); Scott Wentao Li, Cary, NC (US); Robert James Norton, Jr., Raleigh, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 17/196,326

(22) Filed: Mar. 9, 2021

(51) Int. Cl.
*G06F 3/14* (2006.01)
*G09G 5/373* (2006.01)
*G09G 5/38* (2006.01)
*G09G 5/08* (2006.01)

(52) U.S. Cl.
CPC ............. *G06F 3/1446* (2013.01); *G09G 5/08* (2013.01); *G09G 5/373* (2013.01); *G09G 5/38* (2013.01); *G09G 2300/026* (2013.01); *G09G 2340/0464* (2013.01); *G09G 2356/00* (2013.01)

(58) Field of Classification Search
CPC ......... G09G 2300/026; G09G 2360/04; G09G 5/08; G09G 5/373; G09G 5/38; G09G 2340/0464; G09G 2356/00; G06F 3/1446
See application file for complete search history.

(56) References Cited

U.S. PATENT DOCUMENTS

| 2011/0080342 A1* | 4/2011 | Haren | G06F 3/1446 345/163 |
| 2016/0155410 A1* | 6/2016 | Nam | G09G 5/005 715/745 |

\* cited by examiner

*Primary Examiner* — Roy P Rabindranath
(74) *Attorney, Agent, or Firm* — Kunzler Bean & Adamson (57) ABSTRACT

For enhancing multiple monitor arrangements, a method receives monitor data for a plurality of monitors. The monitor data for each monitor includes a physical dimension, a monitor resolution, a monitor position, and a scale factor. The method receives a transition preference specifying one of a physical parameter preference and a logical parameter preference for each monitor-to-monitor boundary of the plurality of monitors. The method calculates a display transition between adjacent monitors based on the monitor data and the transition preference.

18 Claims, 7 Drawing Sheets

ENHANCING MULTIPLE MONITOR ARRANGEMENTS

FIELD

The subject matter disclosed herein relates to monitor arrangements and more particularly relates to enhancing multiple monitor arrangements.

BACKGROUND

Computer users often employ multiple monitors.

BRIEF SUMMARY

A method for enhancing multiple monitor arrangements is disclosed. The method receives monitor data for a plurality of monitors. The monitor data for each monitor includes a physical dimension, a monitor resolution, a monitor position, and a scale factor. The method receives a transition preference specifying one of a physical parameter preference and a logical parameter preference for each monitor-to-monitor boundary of the plurality of monitors. The method calculates a display transition between adjacent monitors based on the monitor data and the transition preference. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
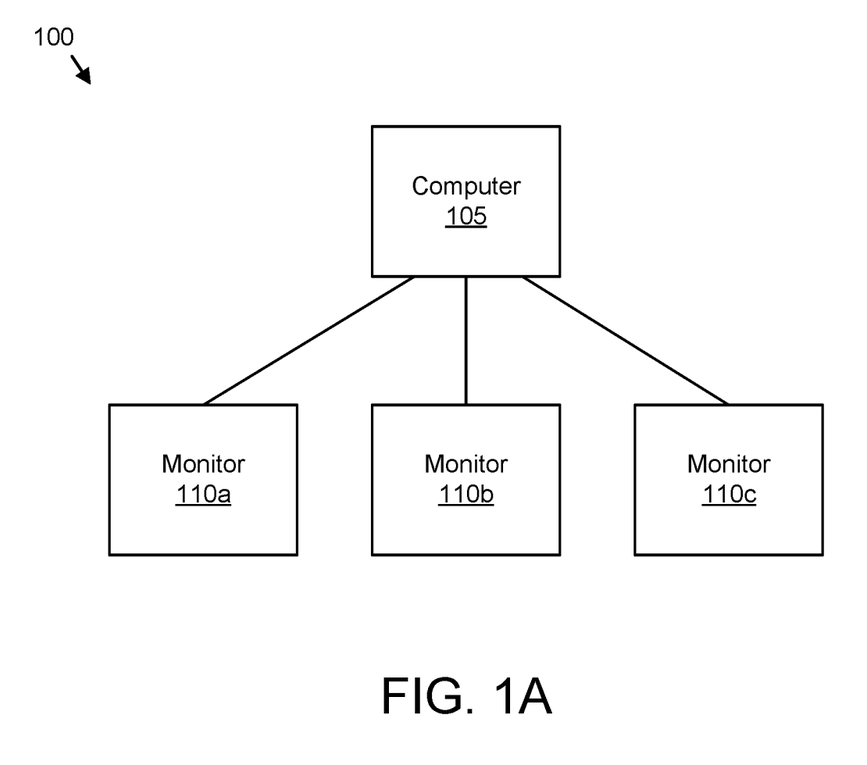
FIG. 1A is a schematic block diagram illustrating one embodiment of multiple monitors.

FIG. 1A is a schematic block diagram illustrating one embodiment of multiple monitors 100. In the depicted embodiment, a computer 105 presents information via a plurality of monitors 110. The information presented by the monitors 110 should be coordinated across the monitors 110 to increase usability.

Figure 1B:
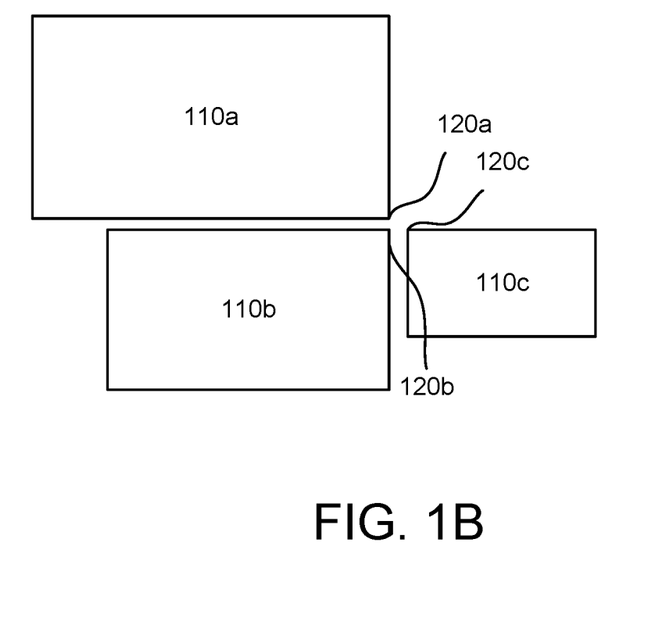
FIG. 1B is a schematic diagram illustrating one embodiment of multiple monitors.

FIG. 1B is a schematic diagram illustrating one embodiment of the multiple monitors 110 of FIG. 1A. In the depicted embodiment, the monitors 110 are of different sizes and relative positions. For example, the adjacent pixels 120a-c of the monitors 110a-c may be of different sizes for each monitor. The first monitor 110a has an adjacent pixel 120a in the lower right corner, the second monitor 110b has an adjacent pixel 120b and an upper right corner, and the third monitor 110c has an adjacent pixel 120c in an upper left corner. In addition, the physical dimensions of each monitor 110 is different. The monitors 110 are also adjacent across both vertical and horizontal boundaries.

In the past, determining display transitions between the adjacent monitors 110 was primarily a manual process that depended on trial and error. The embodiments calculate the display transitions between the adjacent monitors 110 to efficiently and effectively configure the monitors 110 to present information as will be described hereafter.

Figure 2A:
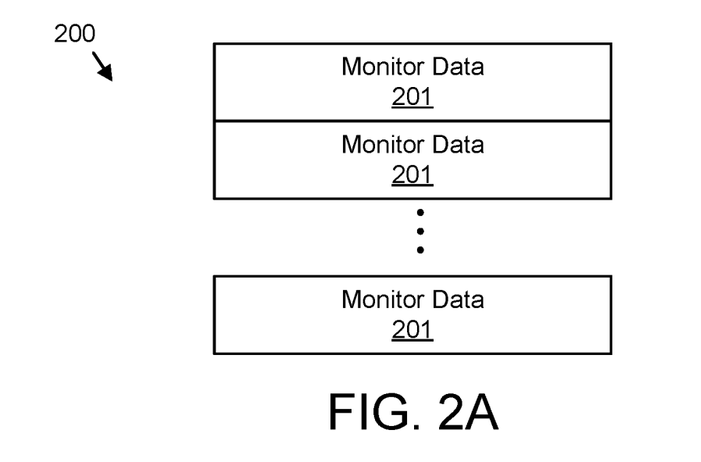
FIG. 2A is a schematic block diagram illustrating one embodiment of a monitor database.

FIG. 2A is a schematic block diagram illustrating one embodiment of a monitor database 200. The monitor database 200 may store monitor data 201 for each of the plurality of monitors 110. The monitor database 200 may be organized as a data structure in a memory. The monitor database 200 includes monitor data 201 for each monitor 110. The monitor data 201 is described in FIG. 2C.

Figure 2B:
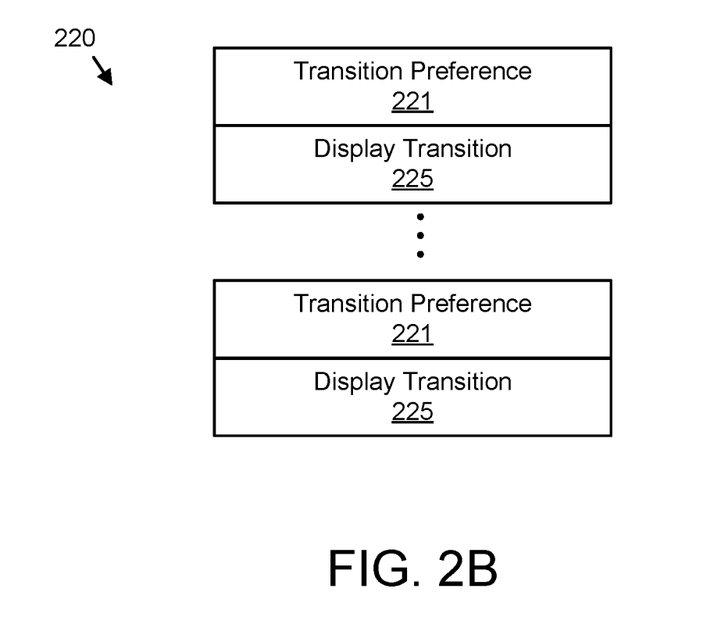
FIG. 2B is a schematic block diagram illustrating one embodiment of transition data.

FIG. 2B is a schematic block diagram illustrating one embodiment of transition data 220. The transition data 220 stores transition preferences 221 and display transitions 225 for each of a plurality of monitors 110.

The transition preference 221 may specify one of a physical parameter preference and the logical parameter preference for each monitor-to-monitor boundary of the plurality of monitors 110. In one embodiment, if the physical parameter preference is specified, a monitor 110 may present information based primarily and/or exclusively on a physical scale. In addition, if the logical parameter preference is specified, a monitor 110 may present information based primarily and/or exclusively on a logical scale.

The display transition 225 specifies a pixel location and/or rendered pixel size of adjacent pixels 120 based on a monitor resolution, the logical scale, the physical scale, an edge size, and/or rental pixel size for adjacent monitors 110 as will be described hereafter.

Figure 2C:
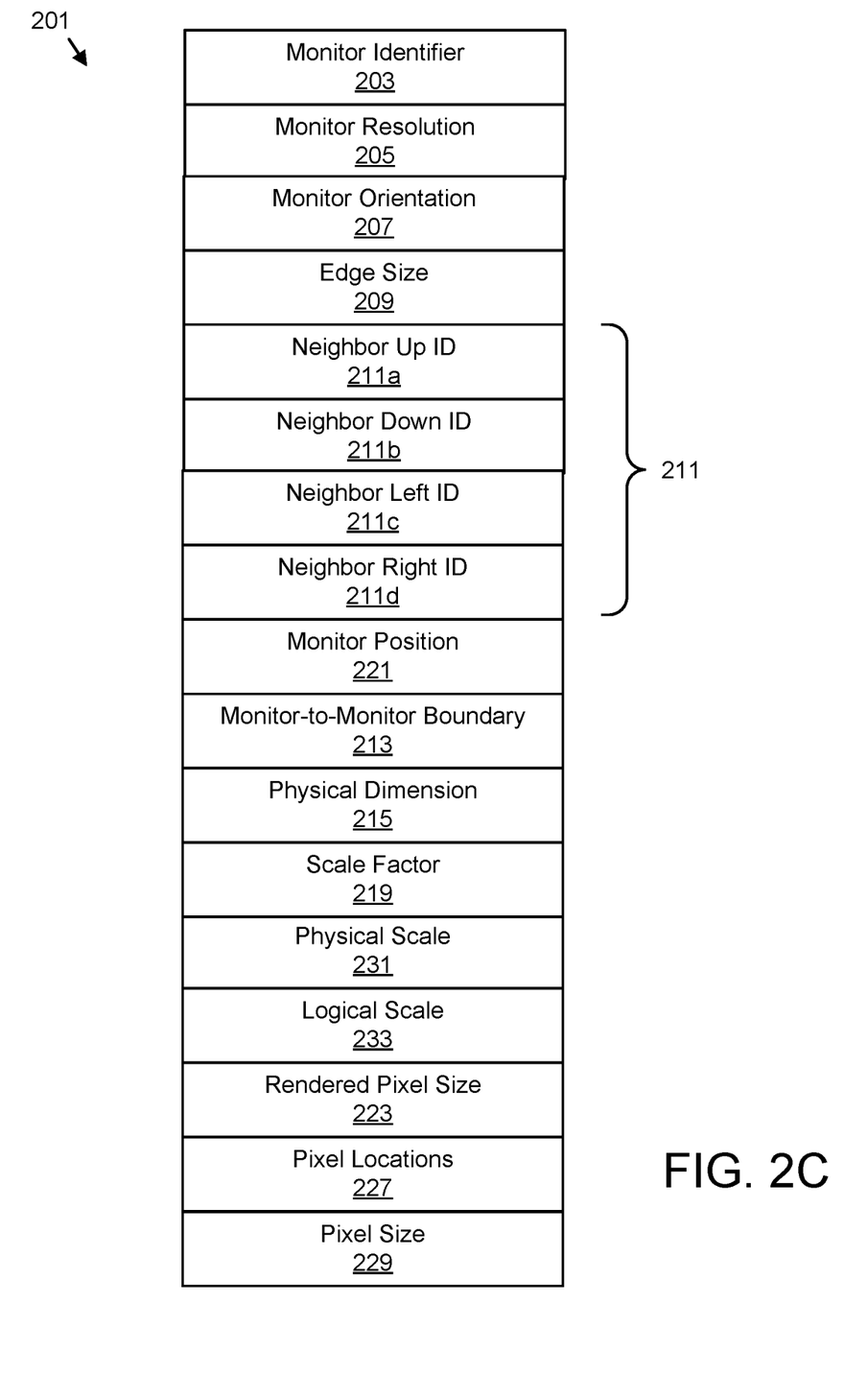
FIG. 2C is a schematic block diagram illustrating one embodiment of monitor data.

FIG. 2C is a schematic block diagram illustrating one embodiment of the monitor data 201. The monitor data 201 may store data for a given monitor 110. The monitor data 201 may be organized as a data structure in a memory. In the depicted embodiment, the monitor data 201 includes a monitor identifier 203, a monitor resolution 205, a monitor orientation 207, an edge size 209, neighbor identifiers 211, a monitor position 221, a monitor-to-monitory boundary 213, a physical dimension 215, a scale factor 219, the physical scale 231, the logical scale 233, the rendered pixel size 223, pixel locations 227, and a pixel size 229.

The monitor identifier 203 may uniquely identify the monitor 110. The monitor resolution 205 may specify a resolution such as 1920×1080. The monitor orientation 207 may specify whether the monitor 110 is oriented landscape, portrait, or at a specified angle.

The edge size 209 may specify a length of adjacent pixels for adjacent monitors 110. The edge size 209 may be measured as a physical dimension and/or a number of pixels.

The neighbor identifiers 211 may record the monitor identifiers 203 of one or more neighbor monitors 110 that are up from the monitor 110, down from the monitor 110, left of the monitor 110, and/or right of the monitor 110 as a neighbor up identifier 211a, a neighbor down identifier 211b, a neighbor left identifier 211c and neighbor right identifier 211d respectively.

The monitor position 221 may specify a physical position of the monitor 110 in space. The monitor position 221 may be relative to a designated monitor 110. The monitor-to-monitor boundary 213 may specify an edge of the monitor 110 adjacent to another monitor 110. The physical dimension 215 may specify a physical length, a physical width, and/or a physical diagonal for the monitor 110.

The scale factor 219 may specify a proportional increase or decrease in rendered pixel size 223. The physical scale 231 may specify a proportional increase or decrease in the rendered pixel size 223 based on the physical dimensions 215. The logical scale 233 may specify a proportional increase in the rendered pixel size 223 based on the monitor resolution 205.

The pixel locations 227 may specify locations of adjacent pixels 120. The pixel size 229 may store a native pixel size for the monitor 110.

Figure 2D:
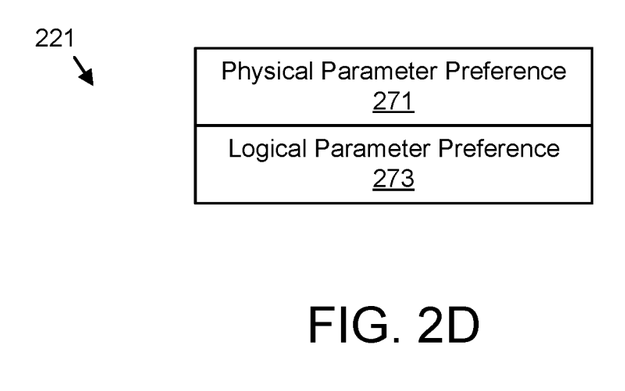
FIG. 2D is a schematic block diagram illustrating one embodiment of a transition preference.

FIG. 2D is a schematic block diagram illustrating one embodiment of the transition preference 221. The transition preference 221 may be organized as a data structure in a memory. In the depicted embodiment, the transition preference 221 includes the physical parameter preference 271 and the logical parameter preference 273. The physical parameter preference 271 and the logical parameter preference 273 may be received from a user and/or specified by a user preference.

Figure 2E:
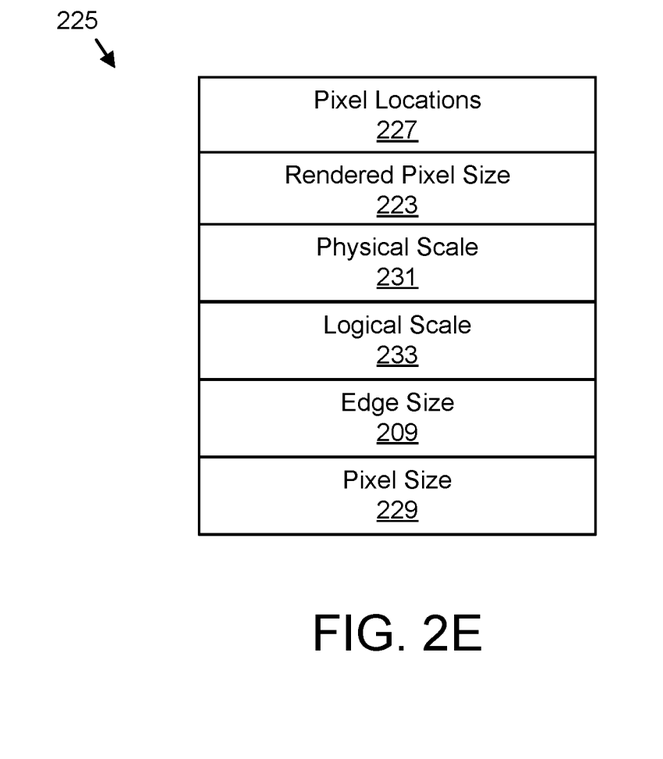
FIG. 2E is a schematic block diagram illustrating one embodiment of a display transition.

FIG. 2E is a schematic block diagram illustrating one embodiment of the display transition 225. The display transition 225 is used to configure each of the monitors 110. The display transition 225 may be organized as a data structure in a memory. In the depicted embodiment, the display transition 225 includes the pixel locations 227, the rendered pixel size 223, the physical scale 231, the logical scale 233, the edge size 209, and the pixel size 229.

Figure 3:
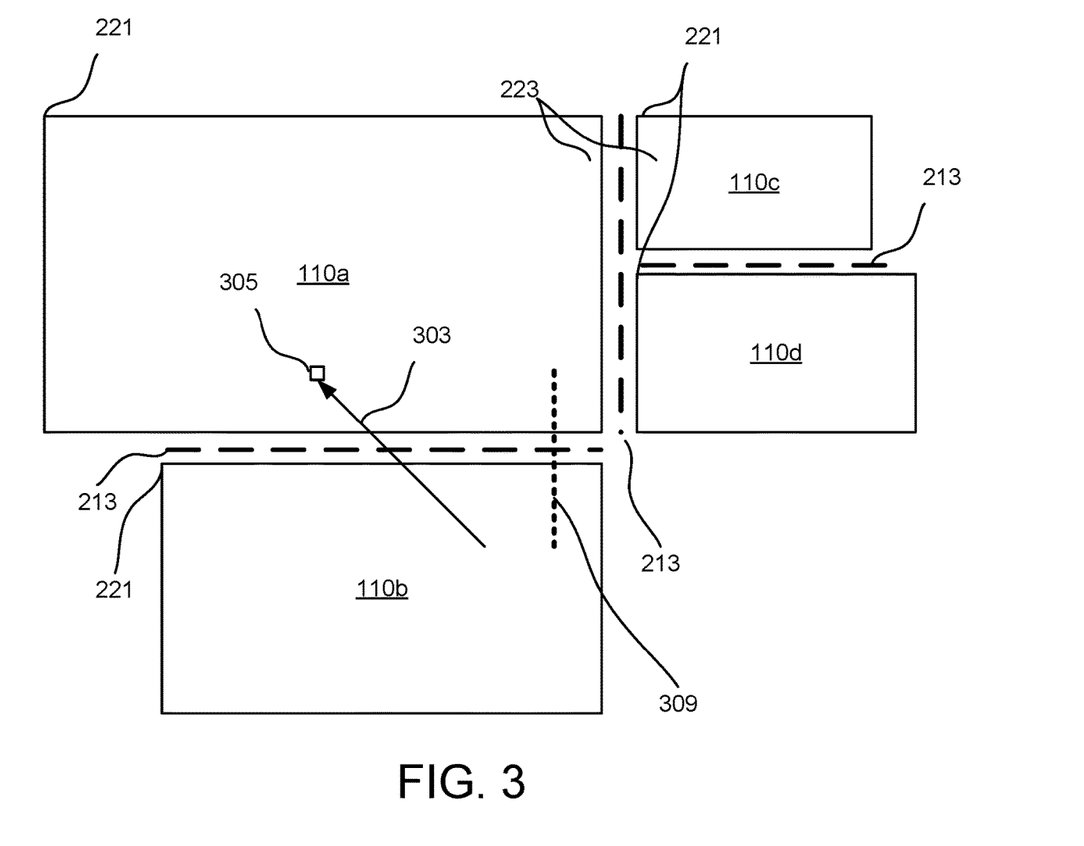
FIG. 3 is a schematic diagram illustrating one embodiment of multiple monitors.

FIG. 3 is a schematic diagram illustrating one embodiment of multiple monitors 110. In the depicted embodiment, a plurality of monitors 110 are shown at monitor positions 221 along with the corresponding monitor-to-monitor boundaries 213. The display transition 225 may align the monitor-to-monitor boundaries 213. In addition, the display transition 225 may scale adjacent monitors 110 to present equivalent rendered pixel sizes 223.

A transition 309 is shown between a first monitor 110a and an adjacent second monitor 110b. The display transition 225 may scale the adjacent first monitor 110a and the second monitor 110b to provide a smooth transition 309 across the monitor-to-monitor boundaries 213. As used herein, a smooth transition 309 refers to adjacent pixels along the transition 309, wherein a first pixel is on the first monitor 110a and a second pixel is on the second monitor 110b function as adjacent pixels on a single physical monitor 110.

In one embodiment, a linear pointer motion of a cursor 305 between adjacent monitors 110 places the cursor 305 on a linear vector 303 corresponding to the linear pointer motion. The linear pointer motion may be a motion of a mouse, trackball, a stylus, or the like.

Figure 4:
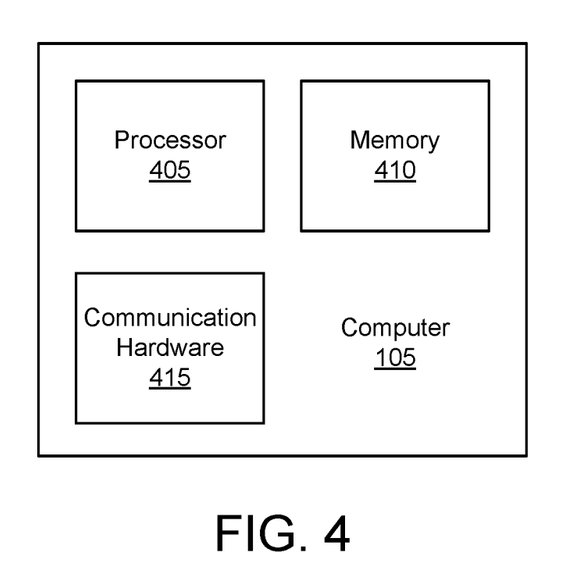
FIG. 4 is a schematic block diagram illustrating one embodiment of a computer.

FIG. 4 is a schematic block diagram illustrating one embodiment of the computer 105. In the depicted embodiment, the computer 105 includes a processor 405, a memory 410, and communication hardware 415. The memory 410 may store code and data. The processor 405 may execute the code and process the data. The communication hardware 415 may communicate with other devices such as the monitors 110.

Figure 5:
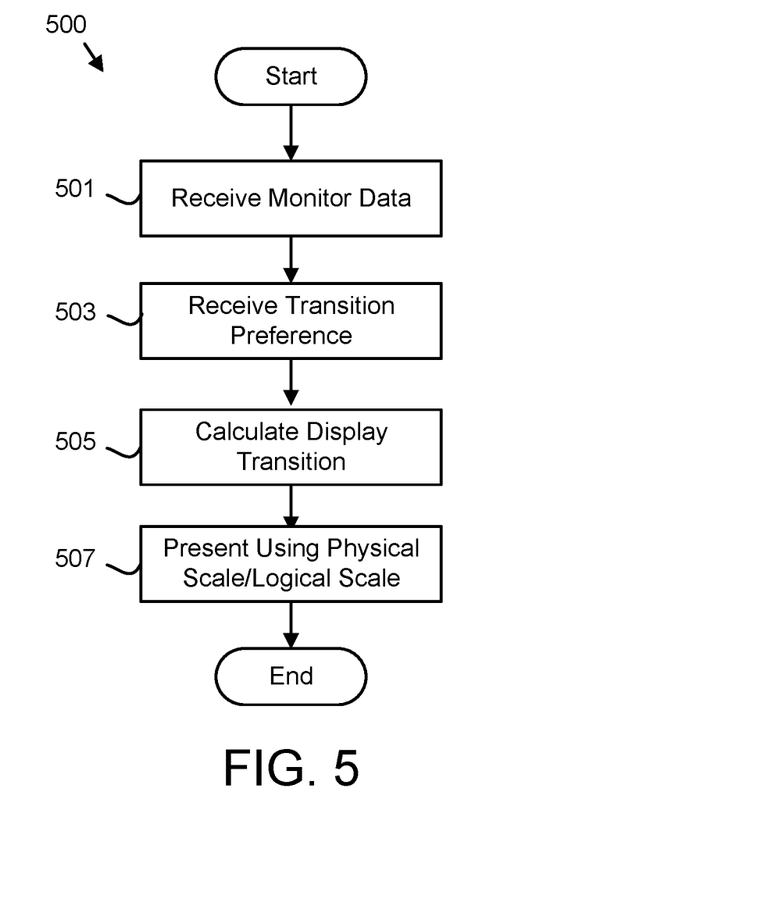
FIG. 5 is a schematic flow chart diagram illustrating one embodiment of a monitor enhancement method.

FIG. 5 is a schematic flow chart diagram illustrating one embodiment of a monitor enhancement method 500. The method 500 may calculate the display transition 225 between one or more adjacent monitors 110 and present information on the monitors 110. The method 500 may be performed by the computer 105 and/or the processor 405.

The method 500 starts, and in one embodiment, the processor 405 receives 501 the monitor data 201 for a plurality of monitors 110. In one embodiment, the monitor data 201 includes at least the physical dimension 215, the monitor resolution 205, the monitor position 221, and the scale factor 219.

The processor 405 may receive 503 the transition preference 221 for each monitor-to-monitor boundary 213. In one embodiment, the processor 405 presents at least one monitor-to-monitor boundary 213 to the user and receives 503 the corresponding transition preference 221. The transition preference 221 may specify one of the physical parameter preference 271 and the logical parameter preference 273 for the monitor-to-monitor boundary 213.

The processor 405 may calculate 505 the display transition 225 between adjacent monitors 110 based on the monitor data 201 and the transition preference 221. In one embodiment, the processor 405 calculates the physical scale 231 and/or the logical scale 233 for each monitor 110 of the plurality of monitors 110. In addition, the processor 405 may calculate the pixel location 227 and the rendered pixel size 223 of adjacent pixels 120 based on the monitor resolution 205, the logical scale 233, the physical scale 231, the edge size 209, and the pixel size 229 for the adjacent monitors 110. In one embodiment, the logical scale 233 determines the rendered pixel size 223 for each monitor 110. The rendered pixel size 223 for each monitor 110 adjacent a given monitor-to-monitor boundary 213 may be equivalent.

In one embodiment, the display transition 225 employs the physical scale 231 if the transition preference 221 is the physical parameter preference 271. The physical scale 231 may specify a proportional increase or decrease in the rendered pixel size 223 based on the physical dimensions 215.

In one embodiment, the display transition 225 employs the logical scale 233 if the transition preference 221 is the logical parameter preference 273. The logical scale 233 may specify a proportional increase in the rendered pixel size 223 based on the monitor resolution 205.

The display transition 225 may align the monitor-to-monitor boundaries 213. In addition, the display transition 225 may scale adjacent monitors 110 to present equivalent rendered pixel sizes 223. For example, the rendered pixel size 223 of the first monitor 110a may appear the same as the rendered pixel size 223 of the second adjacent monitor 110b, even though the pixel size 229 of the first monitor 110a and the second monitor 110b are different.

The display transition 225 may provide a smooth transition 309 across to each monitor-to-monitor boundary 213. As shown in FIG. 3, the linear pointer motion from the first monitor 110a to the second monitor 110b across the monitor-to-monitor boundary 213 places the cursor 305 on the linear vector 303 corresponding to the linear pointer motion. The pixel locations 227 may be provide the smooth transition 309.

The computer 105 and/or processor 405 may present 507 information on each of the plurality of monitors 110 and the method 500 ends. The computer 105 and/or processor 405 may present 507 the information on each of the plurality of monitors 110 using the physical scale 231 and/or the logical scale 233 for each monitor 110. In addition, the computer 105 and/or processor 405 may present the information on each of the plurality of monitors 110 based on the display transition 225.

The embodiments receive the monitor data 201 and the transition preference 221 for each of a plurality of monitors 110 and calculates the display transition 225 between adjacent monitors 110. The display transition 225 aligns the monitor-to-monitor boundaries 213 and/or scales adjacent monitors 110 to provide a smooth, consistent monitor viewing experience. As a result, the function of the computer 105 and the monitors 110 is enhanced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving, by use of a processor, monitor data for a plurality of monitors, the monitor data for each monitor comprising a physical dimension, a monitor resolution, a monitor position, and a scale factor;
   receiving a transition preference specifying one of a physical parameter preference and a logical parameter preference for each monitor-to-monitor boundary of the plurality of monitors; and
   calculating a display transition between adjacent monitors based on the monitor data and the transition preference, wherein the display transition calculates a pixel location and a rendered pixel size of adjacent pixels in the adjacent monitors based on the monitor resolution, a logical scale, a physical scale, an edge size, and a pixel size for the adjacent monitors.

2. The method of claim 1, the method further comprising presenting information on each of the plurality of monitors using the physical scale and the logical scale for each monitor.

3. The method of claim 1, wherein the display transition aligns the monitor-to-monitor boundaries.

4. The method of claim 1, wherein the display transition scales adjacent monitors to present equivalent rendered pixel sizes.

5. The method of claim 1, wherein the display transition provides a smooth transition across monitor-to-monitor boundaries.

6. The method of claim 1, wherein a linear pointer motion from a first monitor to a second monitor across a monitor-to-monitor boundary places a cursor on a linear vector corresponding to the linear pointer motion.

7. The method of claim 1, wherein the logical scale determines a rendered pixel size for each monitor.

8. The method of claim 7, wherein the rendered pixel size for each monitor adjacent a given monitor-to-monitor boundary is equivalent.

9. An apparatus comprising:
   a processor;

a memory storing code executable by the processor to:
receive monitor data for a plurality of monitors, the monitor data for each monitor comprising a physical dimension, a monitor resolution, a monitor position, and a scale factor;
receive a transition preference specifying one of a physical parameter preference and a logical parameter preference for each monitor-to-monitor boundary of the plurality of monitors; and
calculate a display transition between adjacent monitors based on the monitor data and the transition preference, wherein the display transition calculates a pixel location and a rendered pixel size of adjacent pixels in the adjacent monitors based on the monitor resolution, a logical scale, a physical scale, an edge size, and a pixel size for the adjacent monitors.

10. The apparatus of claim 9, the code further executable by the processor to present information on each of the plurality of monitors using the physical scale and the logical scale for each monitor.

11. The apparatus of claim 9, wherein the display transition aligns the monitor-to-monitor boundaries.

12. The apparatus of claim 9, wherein the display transition scales adjacent monitors to present equivalent rendered pixel sizes.

13. The apparatus of claim 9, wherein the display transition provides a smooth transition across monitor-to-monitor boundaries.

14. The apparatus of claim 9, wherein a linear pointer motion from a first monitor to a second monitor across a monitor-to-monitor boundary places a cursor on a linear vector corresponding to the linear pointer motion.

15. The apparatus of claim 9, wherein the logical scale determines a rendered pixel size for each monitor.

16. The apparatus of claim 15, wherein the rendered pixel size for each monitor adjacent a given monitor-to-monitor boundary is equivalent.

17. A program product comprising a non-transitory computer readable storage medium that stores code executable by a processor, the executable code comprising code to:
receive monitor data for a plurality of monitors, the monitor data for each monitor comprising a physical dimension, a monitor resolution, a monitor position, and a scale factor;
receive a transition preference specifying one of a physical parameter preference and a logical parameter preference for each monitor-to-monitor boundary of the plurality of monitors; and
calculate a display transition between adjacent monitors based on the monitor data and the transition preference, wherein the display transition calculates a pixel location and a rendered pixel size of adjacent pixels in the adjacent monitors based on the monitor resolution, a logical scale, a physical scale, an edge size, and a pixel size for the adjacent monitors.

18. The program product of claim 17, the code further executable by the processor to present information on each of the plurality of monitors using the physical scale and the logical scale for each monitor.

* * * * *